(12) United States Patent
Scherer et al.

(10) Patent No.: US 7,525,957 B2
(45) Date of Patent: Apr. 28, 2009

(54) INPUT/OUTPUT ROUTER FOR STORAGE NETWORKS

(75) Inventors: Greg John Scherer, Costa Mesa, CA (US); Karen Mulvany, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 519 days.

(21) Appl. No.: 11/219,019

(22) Filed: Sep. 1, 2005

(65) Prior Publication Data

US 2007/0047536 A1 Mar. 1, 2007

(51) Int. Cl.
H04L 12/66 (2006.01)
H04L 12/28 (2006.01)
G06F 3/00 (2006.01)
G06F 13/00 (2006.01)
G06F 13/42 (2006.01)

(52) U.S. Cl. .................. 370/360; 370/401; 370/463; 370/466; 710/2; 710/11; 710/105; 710/313; 710/315

(58) Field of Classification Search .......... 370/360, 370/401, 463, 466; 710/2, 11, 105, 313, 710/315
See application file for complete search history.

(56) References Cited

U.S. PATENT DOCUMENTS

| | | | | |
|---|---|---|---|---|
| 5,396,602 A | * | 3/1995 | Amini et al. ............ 710/113 |
| 5,450,551 A | * | 9/1995 | Amini et al. ............ 710/119 |
| 5,774,681 A | * | 6/1998 | Kunishige ............... 710/306 |
| 6,449,677 B1 | * | 9/2002 | Olarig et al. ............ 710/305 |
| 6,594,712 B1 | * | 7/2003 | Pettey et al. ............ 710/22 |
| 7,054,978 B1 | * | 5/2006 | Thorsbakken et al. ..... 710/305 |
| 7,093,033 B2 | * | 8/2006 | Beckett et al. .......... 710/11 |
| 7,185,135 B1 | * | 2/2007 | Briggs et al. ............ 710/315 |
| 7,334,064 B2 | * | 2/2008 | Davies et al. ............ 710/62 |
| 7,353,301 B2 | * | 4/2008 | Radhakrishnan et al. ... 710/33 |
| 2002/0085493 A1 | * | 7/2002 | Pekkala et al. .......... 370/235 |
| 2002/0172195 A1 | * | 11/2002 | Pekkala et al. .......... 370/360 |
| 2004/0172494 A1 | | 9/2004 | Pettey et al. |
| 2004/0179529 A1 | | 9/2004 | Pettey et al. |
| 2004/0179534 A1 | | 9/2004 | Pettey et al. |

(Continued)

OTHER PUBLICATIONS

Fibre Channel Framing and Signaling (FC-FS Draft Standard), American National Standard for Information Technology, INCITS/Project 1331-D, Rev. 1.90, Apr. 9, 2003.

(Continued)

*Primary Examiner*—Alpus H Hsu
(74) *Attorney, Agent, or Firm*—Morrison & Foerster LLP (57) ABSTRACT

A blade server is disclosed, comprised of multiple server blades that plug into a midplane from the front, and an I/O router including multiple IOCs (one for each server blade) and an embedded switch that plugs into the midplane from the back. The midplane carries PCI Express lanes for connecting the server blades to the I/O router. Each of the IOCs is physically couplable to a server blade over a separate PCI Express connection in the midplane, preserving existing driver compatibility, and is coupled to the embedded switch via an internal FC link within the I/O router. Each embedded switch may contain full fabric services ports. Alternatively, the full fabric services may be left out, and N_PORT virtualization or FC_AL stealth mode may be employed to allow the embedded switch to interoperate transparently with the external fabric switch and eliminate the third hop in the blade server chassis.

20 Claims, 5 Drawing Sheets

U.S. PATENT DOCUMENTS

| | | |
|---|---|---|
| 2004/0210678 A1 | 10/2004 | Pettey |
| 2004/0260842 A1 | 12/2004 | Pettey et al. |
| 2004/0268015 A1 | 12/2004 | Pettey et al. |
| 2005/0013319 A1* | 1/2005 | Kenkare .................... 370/463 |
| 2005/0025119 A1 | 2/2005 | Pettey et al. |
| 2005/0027900 A1 | 2/2005 | Pettey |
| 2005/0053060 A1 | 3/2005 | Pettey |
| 2005/0102437 A1 | 5/2005 | Pettey |

OTHER PUBLICATIONS

Fibre Channel Device Attach (FC-DA Draft Standard), Information Technology Industry Council, American National Standard for Information Technology, Rev. 3.1, Aug. 3, 2004.

* cited by examiner

INPUT/OUTPUT ROUTER FOR STORAGE NETWORKS

FIELD OF THE INVENTION

This invention relates to blade servers coupled to an external switched fabric or network device, and more particularly, to an Input/Output (I/O) router for enabling communications between server blades in the blade server and devices connected to the external switched fabric or network device.

BACKGROUND OF THE INVENTION

Figure 1:
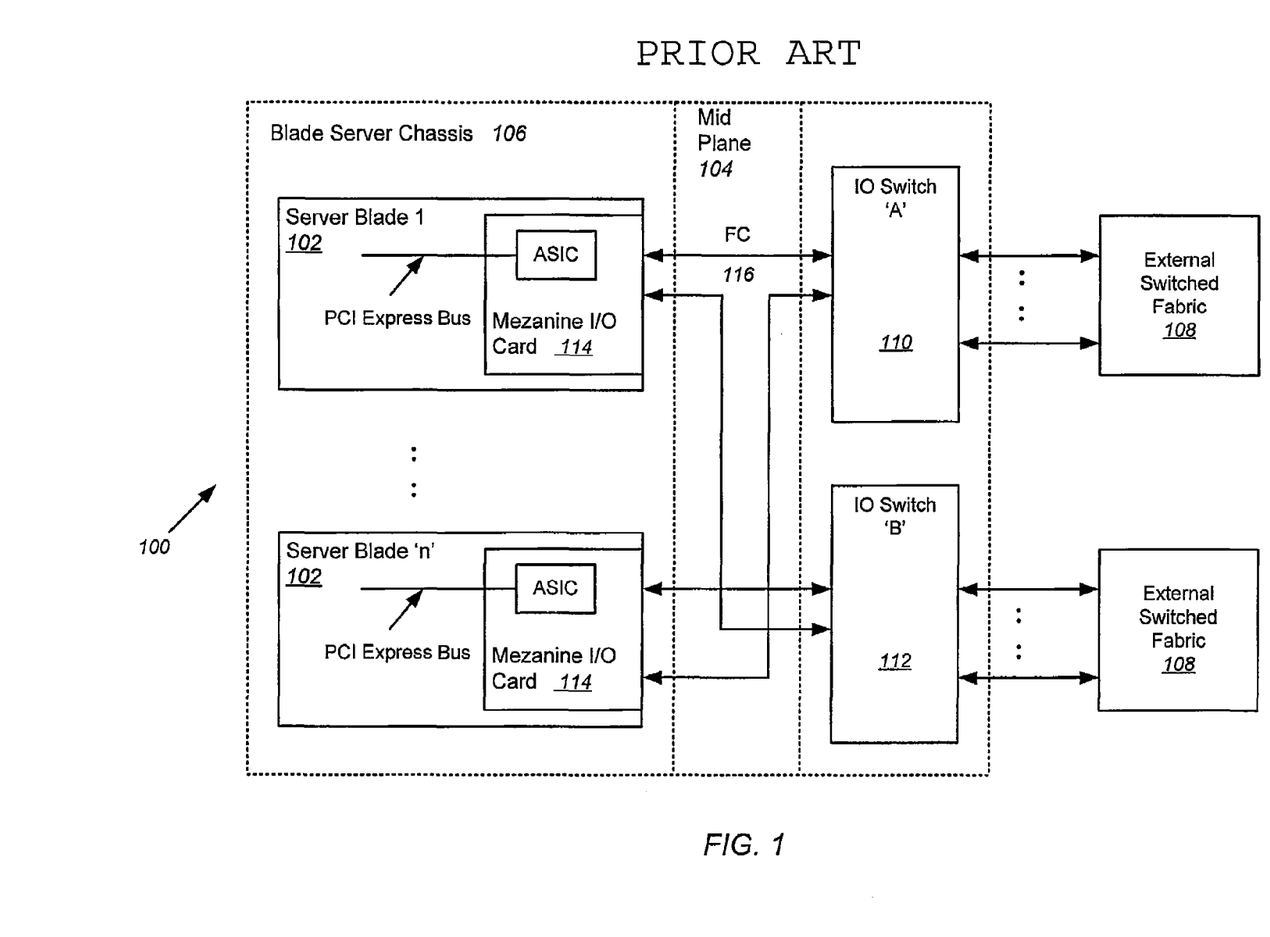
FIG. 1 is an exemplary illustration of a conventional blade server connected to an external switched fabric.

Conventional blade servers. FIG. 1 is an exemplary illustration of a conventional blade server 100 connected to an external switched fabric. Blade servers overcome some of the inefficiencies of individual standalone or rack-mounted one unit (1U) high servers, each of which is self-contained and includes separate power supplies, fans, and the like. Individual servers are therefore inefficient in terms of space, power, cooling, and other characteristics. Blade servers 100 utilize a modular, plug-in approach wherein the housing for each server is eliminated along with self-contained components such as power supplies and fans. Each previously standalone server is therefore reduced to a server "blade" 102 (typically eight to 14 in a blade server chassis 106) capable of being plugged into a midplane 104 within the blade server chassis 106 from the front of the chassis. The midplane 104 contains connectors for receiving the server blades 102 and typically contains from one to four "lanes" or paths on a printed circuit board (PCB) for carrying signals. The midplane 104 therefore eliminates much of the cabling that was required with individual servers. The blade server chassis 106 also provides redundant common cooling and power to the server blades 102 through the midplane 104.

Conventional blade servers 100 may be connected to redundant external switch fabrics 108 through an "A" side Input/Output (I/O) switch 110 and a "B" side I/O switch 112, which plug into the midplane 104 from the back of the chassis 106. Typically, the redundancy enables one switch to take over if the other fails. In addition, the blade server midplane is typically plumbed to allow for multiple independent redundant fabrics or I/O protocols, such as Fibre Channel, Ethernet or InfiniBand. In the case of a Fibre Channel configuration, each embedded switch 110 and 112 may be a Fibre Channel Arbitrated Loop (FC_AL) switch or a full fabric switch, with a separate port to receive a Fibre Channel (FC) link 116 from each of the multiple server blades 102, and output ports for connecting to each of the external switched fabrics 108.

To enable the server blades 102 to communicate with the switch fabric, typically a mezzanine I/O card 114 that performs a Host Bus Adapter (HBA) (a.k.a. I/O Controller (IOC)) function is required in each server blade 102. These mezzanine I/O cards 114 are typically mounted to the server blades 102 as daughter cards. Note that this may also be accomplished by embedding an IOC directly on the server blade. However, this increases complexity for the OEM, who must now make a different server blade for each type of I/O that will be supported. For purposes of this specification, mezzanine I/O cards 114, referred to herein, include both daughter cards and IOCs mounted directly onto the server blade. The output of a mezzanine I/O card 114 is two I/O links 116 routed to each of the two embedded switches 110 and 112. The mezzanine I/O cards 114 follow the standard device driver model, so that when a server blade 102 with a mezzanine I/O card 114 is plugged into the midplane 104 and connected to an embedded switch 110 or 112, it appears to be a standalone server with a Peripheral Component Interconnect (PCI) card communicating with an external switch.

As a means of delivering I/O, mezzanine I/O cards 114 are relatively expensive (compared to the cost of a server blade 102), take up additional space in the rack, generate additional heat, and consume additional power. Because space efficiency, low power and lower heat are significant value propositions for blade servers, the use of mezzanine cards limit the appeal of the overall blade server solution. A key drawback to mezzanine cards has to do with serviceability. Because the mezzanine card is installed in parallel with the server blade, if a problem should arise with the mezzanine card, the entire server blade must be removed to troubleshoot and/or replace the mezzanine card, creating server downtime costs for end users.

In addition to the problems introduced by mezzanine I/O cards 114 described above, the blade server concept also constrains I/O connectivity because it is slot limited. Conventional standalone 1U servers have two PCI slots to plug in two different types of I/O cards. However, in the blade server environment, the server blades 102 have no slots and can typically only accommodate one mezzanine card. Consequently, blade servers that require more than one type of I/O protocol must typically embed an IOC on the blade server itself, in addition to deploying a mezzanine card. For blade servers that require multiple I/O protocols to support multiple network applications, this limitation has created a need for a next generation blade server I/O architecture that can flexibly support multiple I/O protocols.

The use of embedded switches, if they are fabric switches, can result in a violation of the so-called "hop" limitation. Some storage environments do not allow more than three fabric switches to be present in the path between a storage array and a server blade. This limitation on the number of fabric switches is called the hop limitation. For example, with a 3-hop limitation, only three fabric switches can be present in the path between the storage array and the server blade. Adding an embedded fabric switch to the blade server chassis 106 can potentially violate the three switch limit.

Furthermore, interoperability issues may exist between the embedded switches 110 and 112 with E_PORT connectivity and the external switched fabrics 108. For example, the embedded switches of one manufacturer may only interface properly with external fabric switches made by that same manufacturer. These interoperability limitations may force blade server manufacturers to qualify, certify and stock a number of different types of embedded switches 110 and 112. These interoperability issues can be overcome with N_PORT virtualization, discussed below.

Figure 2:
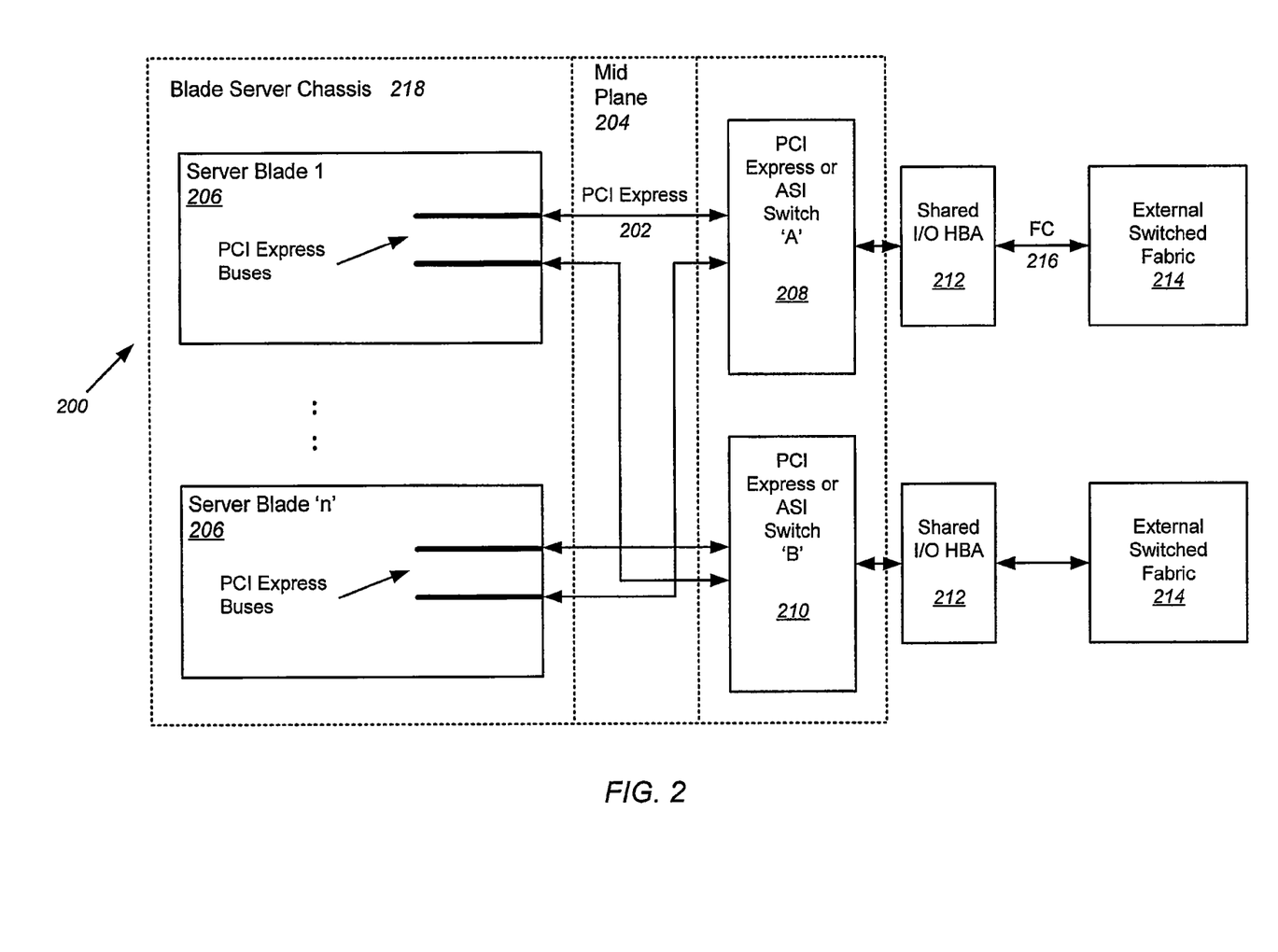
FIG. 2 is an ex/exemplary illustration of a proposed next generation blade server connected to an external switched fabric that implements shared I/O and requires consolidated physical layer switches and shared IOCs that have not yet been implemented.

Emerging next generation blade server system interconnect. Conventional blade servers such as those shown in FIG. 1 primarily utilize parallel PCI in the midplane. However, PCI Express, which is the serialized counterpart of PCI, is now replacing parallel PCI, and can be routed over lanes in the midplane. Referring now to FIG. 2, proposed next generation blade servers 200 will route PCI express 202 over the midplane 204, enabling the IOC function to be moved to a separate location on the chassis away from the blade server itself, eliminating the need for mezzanine I/O cards directly embedded on the server blades 206.

The concept of shared I/O, which deploys an IOC 212 that is shared by multiple hosts (server blades 206) has also emerged to address mezzanine card challenges in blade server environments. Utilization of shared IOCs 212 can result in substantial space savings. In conventional systems, each server blade is connected to a dedicated IOC, and therefore a conventional blade server may include a 14 blade chassis with 14 discrete IOCs (i.e. mezzanine cards) and redundant embedded switches. Using shared I/O, the 14 discrete IOCs may be replaced with fewer shared IOCs, each of which has multiple different frontside "personalities" for the multiple server blades to which it may be connected. However, in order to share the IOC, a new switch must be introduced between the Shared IOC and the blade server. These Shared I/O connections 216 will be logically shared by the server blades 206 connected to the Shared IOC 212 to enable them to communicate with an external switched fabric 214. Because the conventional I/O driver model assumes that each server has a dedicated IOC that is always available, the Shared I/O model requires a change in the I/O driver model, which creates incompatibilities with existing network I/O applications and adds driver complexity to end-user datacenter installations.

To implement shared I/O, the driver model may be changed so that the server blades cooperatively share the IOC 212. However, this latter approach would require new software that would be incompatible with the installed base of I/O drivers to which many applications interface. Furthermore, the shared IOCs 212, although conceptualized, have not yet been implemented. Therefore, although the cost of a shared IOC may be comparable in price to discrete IOCs, the cost and space savings would have to be traded off with the cost of deploying an entirely new switching infrastructure between the blade server and the Shared IOC.

PCI Express switches or Advanced Switch Interface (ASI) (peer-to-peer network) switches 208 and 210 may be deployed between the blade server and the Shared IOC to enable Shared I/O. As FIG. 2 illustrates, in Shared I/O the switches 208 and 210 are located in front of the remote IOCs 212. ASI is a superset of PCI Express. It uses the same electrical signaling, but also provides an endpoint termination device that allows peer-to-peer communication. ASI has developed semantics similar to InfiniBand, which is a low latency peer-to-peer short distance network that is not designed to compete with Ethernet, but rather is designed to compete with older clustering interconnects. Thus, ASI is a true networking device as well as a bus. PCI Express serializes the parallel bus, but is otherwise semantically identical. However, like shared IOCs, these physical layer switches have been conceptualized but not yet implemented.

From a server blade perspective, when changing to a next generation device, it is preferable to utilize the same driver software model so that the same applications software can be executed and the complexity of the network is minimized. However, the Shared I/O model of FIG. 2 will not achieve this compatibility, because new driver software is needed to logically associate the characteristics of the shared IOCs 212 with the server blades 206. In addition, it may be desirable for each server blade 206 to have multiple instances of shared IOCs 212 available for it, because it has a heavier I/O load than another server blade 206. This load balancing requires a new dynamic management mechanism to associate and disaggregate the shared IOCs 212 with the server blades 206.

Therefore, there is a need to provide the benefits of shared I/O in a blade server that achieves similar space, heat, power, serviceability and cost savings, but does not require new blade server driver software, a new shared IOC design, a new switching infrastructure, new consolidated physical layer switches, and new management software.

SUMMARY OF THE INVENTION

Embodiments of the present invention are directed to a blade server comprised of multiple server blades that plug into a midplane from the front of the blade server chassis, and an I/O router including multiple IOCs (one for each server blade) and an embedded switch that plugs into the midplane from the back of the blade server chassis. The midplane carries PCI Express lanes for connecting the server blades to the I/O router. Each of the IOCs is physically couplable to a server blade over a separate PCI Express connection in the midplane. Each IOC is also coupled to the embedded switch via an internal FC link within the I/O router. Each embedded switch contains one or more ports, some of which connect to each of the IOCs over the internal FC links, and some of which provide external FC links that may connect to an external switched fabric or directly to a network attached device.

In one embodiment of the present invention, the embedded switch may be a full fabric switch, and the ports connected to the external switched fabric may be Expansion or Egress ports (E_PORTs). Because a full fabric switch with an E_PORT is counted as a hop, this configuration does not address three hop limitation concerns.

In other embodiments of the present invention, the full fabric services such as E_PORT capability may be left out, and N_PORT virtualization or FC_AL stealth mode may be employed instead. With N_PORT virtualization, each endpoint (IOC) logs into the external switched fabric and requests a unique address by sending a Fabric LOGIn command (FLOGI) to the embedded switch. The embedded switch allows the first FLOGI to pass through to the external switched fabric via the N_PORT, and the fabric returns a FLOGI response with an address (a virtual IDentifier (ID)) to the embedded switch. The embedded switch then returns the FLOGI response back to the requesting IOC. Subsequent requests for an address by other IOCs are converted to Fabric Discovery responses (FDISCs) by the embedded switch and sent to the external switched fabric, which returns an FDISC response with a unique address to the embedded switch. The embedded switch then returns the FDISC response back to the requesting IOC.

In this manner, the embedded switch can be used as an intelligent proxy so that the external fabric ports do not even know that they are not directly connected to IOCs. The embedded switch effectively disappears from the perspective of the external fabric, which perceives IOCs, and more particularly from the perspective of the server blades incorporating the IOCs. In addition, each server blade is communicating with two dedicated IOCs and thinks that the IOCs are directly connected to an external fabric, without an embedded switch. The embedded switch also effectively disappears from the perspective of the external switched fabric, which thinks there are multiple IOCs communicating directly with it because of the virtualized requests it received. It should also be noted that if N_PORT virtualization is employed, the embedded switch is not counted as a switch hop.

Even if the external fabric does not support N_PORT virtualization, commercially available FC_AL storage switches can be used to map multiple IOCs on one loop and multiple IOCs on one or more other loops, creating multiple loop zones. In this FC_AL stealth mode, the server blades think they are on a loop and talking through an FL_PORT to the external switched fabric, because that is how they would be talking in FC_AL mode through an IOC. The server blades would not know that the embedded switch was connected in the middle. The software on the server blades thinks it is on a loop, so there is no need to change the drivers. From an embedded switch point of view, the switch thinks it is talking to an FL_PORT, which it is used to talking to. In fact, the server blades are not connected to a loop at all, but the embedded switch has made it appear as though it were.

In a conventional static loop, if one of the ports goes down, all IOCs would lose their communication path. In N_PORT virtualization or FC_AL stealth mode where the embedded switch provides multiple loops and multiple $N_{13}$ PORTS connected to the external switched fabric, failover and pseudo load balancing may be implemented. If the embedded switch monitors a FC link and detects a break, the switch can update its routing tables and move traffic on the affected port over to the surviving ports and indicate to the affected ports that a link-down event just occurred. The normal course of action would be for the affected ports to login again, resulting in a number of new devices suddenly showing up on the surviving loop and virtual $N_{13}$ PORT. This capability provides both a failover and pseudo, load balancing as well as an interoperability mode that will work with all existing fabrics.

Multi-protocol blade servers may also be employed. In a multi-protocol implementation, each IOC may include a FC port and a port implementing another protocol (e.g. SAS). The FC port is connected to a FC embedded switch over an internal FC link, which in turn is connected to a FC external switched fabric over an external FC link. The SAS port is connected to a SAS expander over an internal SAS link, which in turn is connected to a SAS external switched fabric over an external SAS link. The IOCs, FC embedded switch, and SAS expander may be discrete components or consolidated onto a single I/O router chip and mounted on an I/O router card. The I/O router card could be configured at the factory to be useable for either SAS or FC, but not both.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Although embodiments of the present invention are described herein in terms of FC signaling, it should be understood that the present invention is not limited to FC, but includes InfiniBand, Ethernet, Serial Attached Small Computer System Interconnect (SAS) signaling and the like. Implementation of these protocols requires that the midplane support the protocols.

Figure 3:
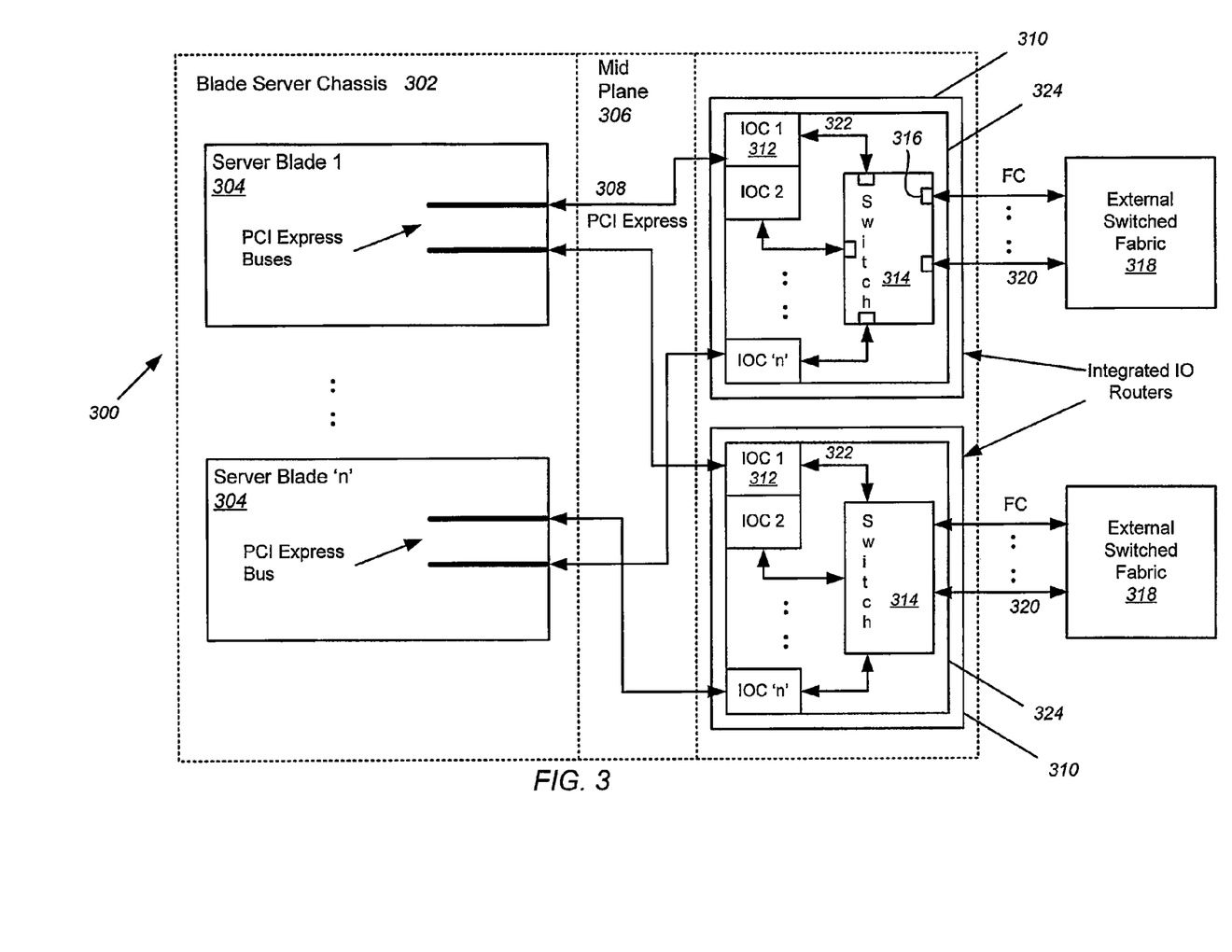
FIG. 3 is an exemplary illustration of a blade server connected to an external switched fabric according to embodiments of the present invention.

FIG. 3 illustrates an exemplary blade server 300 according to embodiments of the present invention. The blade server chassis 302 includes multiple (e.g. 8-14) server blades 304 that plug into a midplane 306 from the front of the blade server chassis 302. The midplane 306 carries PCI Express lanes 308 for connecting the server blades 304 to multiple (e.g. two) backend I/O router modules or subsystems 310, which plug into the midplane 306 from the back of the blade server chassis 302. Each backend I/O router subsystem 310 includes multiple IOCs 312, one for each server blade 304 in the blade server chassis 302, integrated with a routing element such as an embedded switch 314. Each of the IOCs 312 is physically couplable to a server blade 304 over a separate PCI Express connection 308 in the midplane 306. An example of a commercially available IOC is Emulex Corporation's Lightpulse Zephyro® 4 Gb/s FC PCI Express x4 Controller. Each IOC 312 is also coupled to the backend or embedded switch 314 (e.g. one or more Emulex FibreSpy™ SOC 804 embedded storage switches) via an internal FC link 322. The embedded switch 314 is located within the chassis, behind the IOCs 312. The embedded switch 314 may be managed by one of the IOCs 312, without the need for an Ethernet port. Each embedded switch 314 contains one or more ports 316, some of which are internal and connect to each of the IOCs 312 over the internal FC links 322, and some of which are external and provide external FC links 320 that may connect to Storage Area Network (SAN) element such as an external switched fabric 318 or directly to a network attached device.

The I/O router card 310 according to embodiments of the present invention performs similar I/O aggregation, remote I/O and integration functions to shared I/O, but, unlike Shared I/O, is fully compatible with existing driver and applications software models. Within a chip only a single channel is needed from each IOC to the embedded switch 314, and thus single channel IOC designs may be replicated on the chip 324. Note that single-chip implementations would have been impractical in earlier chip technologies, but now it is possible to fit everything on one chip. In other embodiments, the IOCs 312 and embedded switch 314 may be discrete.

The embodiment of FIG. 3 is counterintuitive, because FC is typically used over long distances. FC was not designed to be an on-chip or even inter-module connection. However, the benefit of using FC between the IOCs 312 and the embedded switch 314 is that it allows for driver compatibility that would not otherwise have been possible, and allows the embedded switch to be implemented in such a way that it is "invisible," as will be described in further detail below. In other words, instead of adding software complexity, embodiments of the present invention duplicates existing hardware designs to preserve existing hardware and software investments.

The embodiment of FIG. 3 differs from Shared I/O models because the switch is placed behind the IOCs, rather than in front of the IOCs as is the case with Shared I/O.

In one embodiment of the present invention, the embedded switch 314 may be a full fabric switch, and the ports 316 connected to the external switched fabric 318 may be Expansion or Egress ports (E_PORTs). The data packets are the same for all ports, but the control packets are different, so that when switches are communicating over E_PORTs, they are communicating information that would never be sent to or received from a Node port (N_PORT). For example, E_PORTS may communicate information on how to share routing tables, or what the delays are like in the other links in the fabric. E_PORTs have specialized firmware to read this information that other ports cannot read. The smarter the port, the more expensive it is because of the complexity it requires. Fabric switches are therefore expensive because they utilize E_PORTS and contain an Ethernet controller, management software, and the like to enable them to behave like fabric switches. Because a full fabric switch with an E_PORT is counted as a hop, this configuration does not address three hop limitation concerns.

In other embodiments of the present invention, the full fabric services such as E_PORT capability may be left out, and N_PORT virtualization or FC_AL stealth mode (described below) may be employed instead. Such embodiments are desirable to eliminate the third hop in the blade server chassis, to reduce blade server complexity and if external edge fabric switches are preferred. In addition, interoperability issues may arise with E_PORT connectivity. If an embedded switch from one company is used inside the I/O router card 310 and an external switch from another company is used outside the blade server chassis, today's conventional hardware only provides for an inter-switch link between the two in a feature-limited interoperability mode, constraining the value of the fabric services. In the present invention, using N_PORT virtualization or the FC_AL stealth mode, the embedded switch 314 can interoperate transparently with the external fabric switch.

Figure 4:
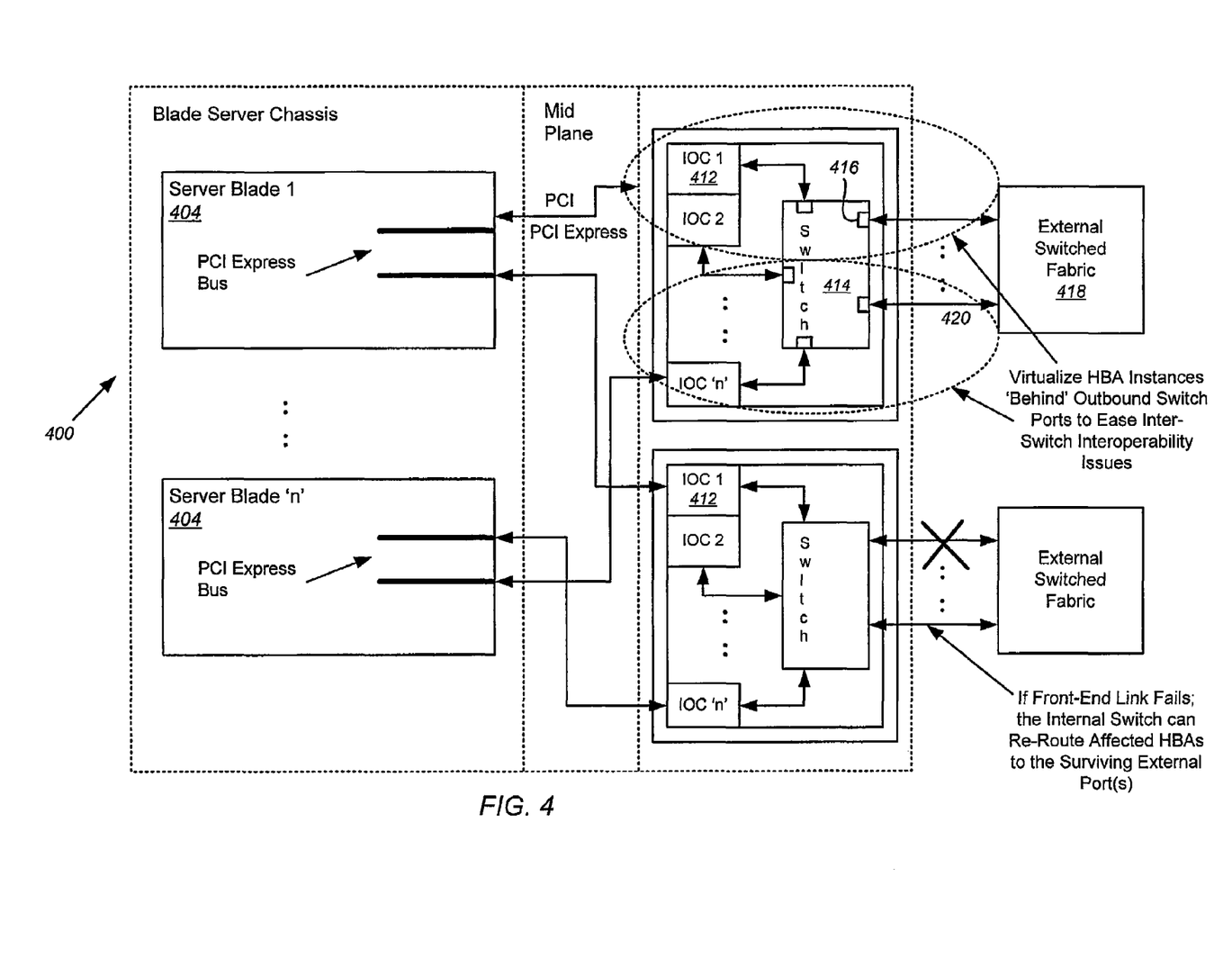
FIG. 4 is an exemplary illustration of a blade server employing N_PORT virtualization or a FC_AL stealth mode according to embodiments of the present invention.

N_PORT virtualization. FIG. 4 illustrates a blade server 400 incorporating N_PORT virtualization according to embodiments of the present invention. N_PORT virtualization has been fully adopted. (See the FC-DA Technical Report (clause 4.13 N_Port_ID Virtualization) and the FC-FS Standard (clause 12.3.2.41 Discover F_Port Service Parameters (FDISC)), the contents of which are incorporated herein by reference. Note that there is no specific mention of N_Port_ID Virtualization in the FC-FS Standard, but the FDISC description has been modified to allow Address ID assignment per $N_{13\ Port}$_ID Virtualization.) With N_PORT virtualization, each endpoint (IOC 412) logs into the external switched fabric 418 and requests a unique address by sending a Fabric LOGIn command (FLOGI) to the embedded switch 414. The embedded switch allows the first FLOGI to pass through to the external switched fabric 418 via the N_PORT, and the fabric returns a FLOGI response with an address (a virtual IDentifier (ID)) to the embedded switch 414. The embedded switch 414 then returns the FLOGI response back to the requesting IOC 412. Subsequent requests for an address by other IOCs 412 are converted to Fabric Discovery responses (FDISCs) by the embedded switch 414 and sent to the external switched fabric 418, which returns an FDISC response with a unique address to the embedded switch. The embedded switch 414 then returns the FDISC response back to the requesting IOC 412.

In this manner, the embedded switch 414 can be used as an intelligent proxy so that the external fabric ports do not even know that they are not directly connected to IOCs. The embedded switch 414 effectively disappears from the perspective of the external fabric, which perceives IOCs 412, and more particularly from the perspective of the server blades 404 incorporating the IOCs. In addition, each server blade 404 is communicating with two dedicated IOCs 412 and thinks that the IOCs are directly connected to an external fabric, without an embedded switch 414. The embedded switch 414 also effectively disappears from the perspective of the external switched fabric 418, which thinks there are multiple IOCs 412 communicating directly with it because of the virtualized requests it received.

It should also be noted that if N_PORT virtualization is employed, the embedded switch 414 is not counted as a switch hop.

FC_AL stealth mode. Even if the external fabric 418 does not support N_PORT virtualization, commercially available FC_AL storage switches (e.g. Emulex FibreSpy™ SOC 804 embedded storage switches) can be used to map multiple IOCs 412 (e.g. seven) on one loop and multiple IOCs 412 (e.g. seven) on one or more other loops, creating multiple loop zones. In this FC_AL stealth mode, the server blades 404 think they are on a loop and talking through an FL_PORT to the external switched fabric 418, because that is how they would be talking in FC_AL mode through an IOC 412. The server blades 404 would not know that the embedded switch 414 was connected in the middle. The software on the server blades 404 thinks it is on a loop, so there is no need to change the drivers. From an embedded switch 414 point of view, the switch thinks it is talking to an FL_PORT, which it is used to talking to. In fact, the server blades 404 are not connected to a loop at all, but the embedded switch 414 has made it appear as though it were.

In a conventional static loop, if one of the ports goes down, all IOCs would lose their communication path. In N_PORT virtualization or FC_AL stealth mode where the embedded switch 414 provides multiple loops and multiple N_PORTS 416 connected to the external switched fabric 418, failover and pseudo load balancing may be implemented. If the embedded switch 414 monitors a FC link 420 and detects a break, the switch can update its routing tables and move traffic on the affected port over to the surviving ports and indicate to the affected ports that a link-down event just occurred. The normal course of action would be for the affected ports to login again, resulting in a number of new devices suddenly showing up on the surviving loop and virtual N_PORT. This capability provides both path failover and pseudo load balancing as well as an interoperability mode that will work with all existing fabrics.

In either N_PORT virtualization or the FC_AL stealth mode (a.k.a. FC_AL aliasing), the embedded switch is similar to a transparent switch ("a T switch"). In other words, it has all the aspects of a switch, but it is fully transparent from both ends.

Figure 5:
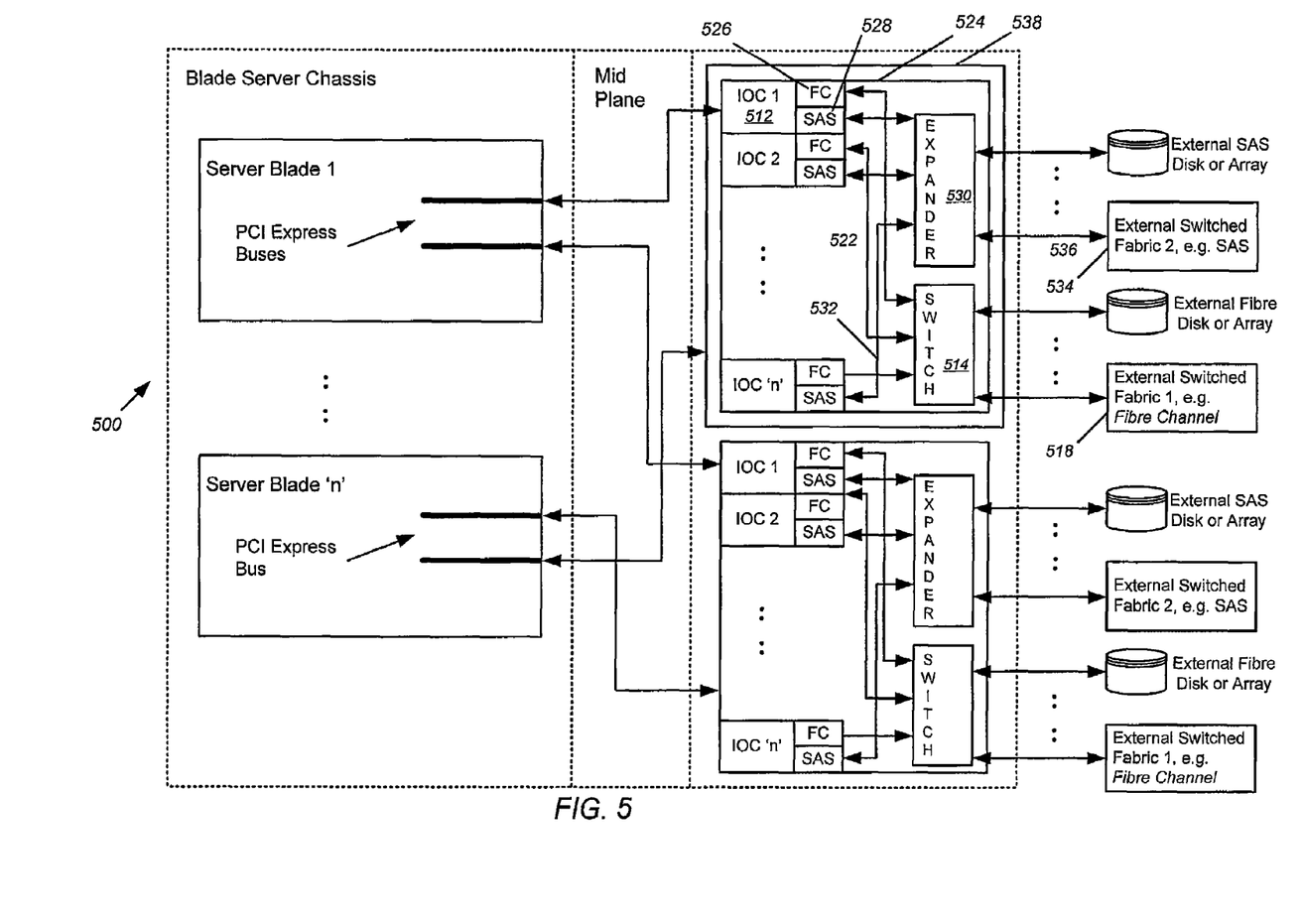
FIG. 5 is an exemplary illustration of a multi-protocol blade server according to alternative embodiments of the present invention.

Multi-protocol. FIG. 5 illustrates an exemplary multi-protocol blade server 500 according to alternative embodiments of the present invention. Note that although FIG. 5 illustrates the FC and SAS protocols for purposes of illustration and explanation, other protocols (e.g. InfiniBand, iSCSI, Ethernet and the like) may be used and fall within the scope of the present invention. In FIG. 5, each IOC 512 includes a FC port 526 and a SAS port 528. The FC port 526 is connected to a FC embedded switch 514 over an internal FC link 522, which in turn is connected to a FC external switched fabric 518 over an external FC link 520. The SAS port 528 is connected to an internal port on a SAS expander 530 over an internal SAS link 532. An example of a commercially available SAS expander is PMC-Sierra's PM8387 SXP 36×3G SAS Expander. One or more external ports on the SAS expander 530 is also connected to a SAS external switched fabric 534 over an external SAS link 536. The IOCs 512, FC embedded switch 514, and SAS expander 530 may be discrete components or consolidated onto a single I/O router chip 524 and mounted on an I/O router card 538. The I/O router card 538 could be configured at the factory to be useable for either SAS or FC, but not both.

One possible use for the FC-SAS multi-protocol blade server of FIG. 5 is during system startup. It may be desirable for the server blades 404 to boot off a local SAS disk instead of over a Storage Area Network (SAN). One multi-protocol I/O router 538 could be used to perform the FC SAN function as well as the local boot device function. Each of the server blades would boot off the same SAS port accessible through the SAS expander 530 and a multi-protocol IOC 512. In one embodiment, one or more SAS boot disks would be partitioned so that each server blade 404 had its own boot section.

Advantages of the present invention. The I/O router described above according to embodiments of the present invention provides for a number of advantages. An advantage is that removing the IOC from the server blades allows blade server OEMs to stock one server blade instead of a number of variants of server blades. It also cuts down on the development and test effort costs for the server blade companies and IOC companies because there is no need to create multiple modules that have to interoperate.

In a conventional blade server with a mezzanine card in each server blade, if the mezzanine card malfunctions it will take out the entire server blade because it controls both channels. Another advantage of embodiments of the present invention is that because the I/O load has been split into an A side and a B side, and each I/O router module can be replaced or serviced independently without having to pull out and decommission the blade server to service the I/O.

Yet another advantage of embodiments of the present invention is the cost savings that results from simply reducing the mezzanine cards to silicon.

Another advantage of embodiments of the present invention is a reduction in heat and power and an increase in processing density due to the elimination of the mezzanine cards. Every server blade with a mezzanine card has its own power regulator, regulating 3.3V down to 1.8V or 2.5V, for example. The accurate resistors in the regulators dissipate heat. By consolidating the server blade into a smaller footprint and package, this extra heat and power is eliminated, adding to the longevity of the server blades. Elimination of the mezzanine cards also saves space in the server blades by reducing their height, allowing decreased spacing between blades and higher density.

Another advantage of embodiments of the present invention when implemented in an integrated silicon instantiation is the elimination of a SERializer/DESerializer (SERDES) requirement. SERDES take up a significant amount of die area, and if there are 14 IOCs and an embedded switch with enough ports to support these 14 IOCs within a single I/O router chip, 28 SERDES can be eliminated within the chip, resulting in a substantial die area savings.

Another advantage of embodiments of the present invention is its compatibility with existing drivers. The driver software running in conventional server blades or standalone servers is a well-qualified, well-known entity that leverages years of interoperability testing between applications and networked devices. As mentioned with regard to the proposed next generation blade servers of FIG. 2, new drivers and/or new IOCs would be required. In embodiments of the present invention, including the discrete implementation or the integrated implementation where the IOCs and embedded switch are within a single I/O router chip, and regardless of whether the I/O router operates in N_PORT virtualization or FC_AL stealth mode, the same drivers can be used. This allows a user to use existing infrastructure to the greatest extent possible while requiring as little re-qualification as possible.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An Input/Output (I/O) router communicatively couplable to a plurality of server blades in a blade server chassis through a midplane carrying Peripheral Component Interconnect (PCI) Express, comprising:
    a plurality of I/O Controller (IOC) modules, each of a first group of one or more of the plurality of IOC modules couplable to a different server blade for converting between PCI Express and a first protocol; and
    a routing element containing a plurality of internal ports coupled to each of the first group of IOC modules and one or more external ports couplable to a Storage Area Network (SAN) implementing the first protocol, the routing element configured for routing the first protocol between the internal ports and the external ports.

2. The I/O router as recited in claim 1, wherein the one or more external ports are Expansion Ports (E_PORTs).

3. The I/O router as recited in claim 1, wherein the plurality of IOC modules and the routing element implement Node Port (N_PORT) virtualization for enabling the routing element to operate transparently.

4. The I/O router as recited in claim 1, wherein the routing element is a Fibre Channel Arbitrated Loop (FC_AL) switch for enabling the routing element to operate transparently.

5. The I/O router as recited in claim 1, wherein the I/O router is fully compatible with existing driver and applications software models.

6. The I/O router as recited in claim 1, the routing element configured for:
    monitoring the one or more external ports;
    detecting a failure on a link connected to one of the external ports;
    updating routing tables to route traffic to another external port; and
    indicating to the external port connected to the failed link that a link-down event occurred.

7. The I/O router as recited in claim 1, wherein the first protocol is Fibre Channel (FC).

8. The I/O router as recited in claim 1, further comprising:
    a second group of one or more of the plurality of IOC modules, each of the second group of IOC modules couplable to a different server blade for converting between PCI Express and a second protocol; and
    an expander device containing a plurality of internal ports coupled to each of the second group of IOC modules and one or more external ports couplable to a SAN implementing the second protocol, the expander device for routing the second protocol between the expander device internal ports and external ports.

9. The I/O router as recited in claim 8, wherein the second protocol is Serial Attached SCSI (SAS).

10. A blade server comprising the I/O router of claim 1.

11. A storage area network comprising the blade server of claim 10.

12. A method for communicatively coupling a plurality of server blades in a blade server chassis to devices on a Storage Area Network (SAN), comprising:
    co-locating a plurality of I/O Controller (IOC) modules and a routing element in an area separate from the plurality of server blades;
    connecting each of a first group of one or more of the plurality of IOC modules to a different internal port on the routing element so that the first group of IOC modules can be communicatively coupled between a different server blade and the routing element;
    converting between Peripheral Component Interconnect (PCI) Express and a first protocol using the first group of IOC modules; and
    routing the first protocol between the internal ports and one or more external ports on the routing element, the one or more external ports couplable to the devices on the SAN implementing the first protocol.

13. The method as recited in claim 12, further comprising routing the first protocol between the first internal ports and one or more first external Expansion Ports (E_PORTs).

14. The method as recited in claim 12, further comprising operating the routing element transparently by implementing Node Port (N_PORT) virtualization within the plurality of IOC modules and the routing element.

15. The method as recited in claim 12, further comprising operating the routing element transparently by employing a Fibre Channel Arbitrated Loop (FC_AL) switch as the routing element.

16. The method as recited in claim 12, further comprising employing IOC modules that are fully compatible with existing driver and applications software models in the server blades.

17. The method as recited in claim 12, further comprising:
monitoring the one or more first external ports;
detecting a failure on a link connected to one of the first external ports;
updating routing tables to route traffic to another first external port; and
indicating to the first external port connected to the failed link that a link-down event occurred.

18. The method as recited in claim 12, wherein the first protocol is Fibre Channel (FC).

19. The method as recited in claim 12, further comprising:
co-locating an expander device along with the plurality of I/O Controller (IOC) modules and the routing element in the area separate from the plurality of server blades;
connecting each of a second group of one or more of the plurality of IOC modules to a different internal port on the expander device so that the second group of IOC modules can be communicatively coupled between a different server blade and the expander device;
converting between Peripheral Component Interconnect (PCI) Express and a second protocol using the second group of IOC modules; and
routing the second protocol between the internal ports and one or more external ports on the expander device, the one or more external ports couplable to the devices on the SAN implementing the second protocol.

20. The method as recited in claim 19, wherein the second protocol is Serial Attached SCSI (SAS).

* * * * *